Patented Sept. 27, 1932

1,880,157

UNITED STATES PATENT OFFICE

IVAR SETTERBERG, OF STOCKHOLM, SWEDEN

PROCESS OF MANUFACTURING POROUS REFRACTORY ARTICLES

No Drawing. Application filed December 3, 1931, Serial No. 578,850, and in Sweden October 15, 1931.

This invention refers to an improved process of manufacturing porous refractory bricks and other refractory articles.

The chief object is to manufacture porous refractory articles of low specific gravity, which will have great heat-insulating capacity, high resistance against high temperatures and which at the same time will possess the necessary mechanical tenability and strength to be used as lining in ovens, kilns, and the like where high temperatures are employed.

Another object of the invention is to reduce the losses on account of breakage in the manufacture of porous refractory articles by subjecting the moulded articles to a special treatment by which their strength is increased before the articles obtain their final strength by firing.

The invention consists, chiefly, in a combination of steps, comprising producing an intimate plastic mixture of non-setting refractory material, gas developing material and water, allowing gas development to take place in the plastic mixture while in the cold state to produce a substantially uniform distribution of voids throughout the mass thereof, moulding bodies of the porous plastic mass, impregnating the surface layers of said bodies with a binding agent while leaving the cores of the bodies free from binding agent, drying the impregnated bodies, and finally firing them at a high temperature.

In carrying out my invention in its preferred form, finely powdered refractory material, as for instance refractory clay, chamotte, kaoline, quartz, quartzite, flint, magnesite, dolomite, chromite, aluminium oxide or the like, is mixed with water to the consistency of a plastic dough, at the same time aluminium powder is added which is intimately and uniformly distributed in such dough and causes the development of small bubbles of hydrogen gas in the dough on account of its reaction with water according to the formula $Al_2 + 3H_2O = Al_2O_3 + 3H_2$. In order to favor or assist the gas forming process in the dough or mass, a suitable amount of alkali, lime or other basic material is, preferably, added.

After completion or termination of said gas-forming reaction or if desired already when said reaction is going on, the mass is placed in moulds to produce the desired porous articles. The more finely the raw material is powdered or ground the smaller the pores will be and if the gas developing agent is finely pulverized and intimately mixed with the powdered refractory material, a product will be produced with innumerable pores or voids of exceedingly small size and evenly distributed in the whole mass of the articles moulded.

The articles thus moulded from the porous mass are left to partly dry in the moulds and are then taken out from the moulds and impregnated with a binding agent in such manner that the binding agent penetrates the surface layer of the articles only while the chief portion of their mass will remain free from the binding agent. The object of such impregnation is to obtain a thin surface layer or shell on the articles which layer or shell after its drying possesses a comparatively high mechanical strength. In this manner the articles obtain a sufficient firmness or strength to resist the mechanical stresses in the subsequent operations without any material breakage.

I prefer to use an organic binding agent which is completely or essentially burned away in the firing of the moulded articles without leaving any residue which may be detrimental for the refractoriness and the heat insulating properties of the article. Such binding agents are for instance waste sulphite liquor, molasses, solutions of glue or dextrine, wood tar and lime, resinous soap and similar products known as binding agents in briquetting pulverulent bodies. The impregnation may for instance be effected in such manner that the moulded articles after their removal from the moulds are besprinkled with a solution of the binding agent in a finely divided state or are dipped into a thin solution of the binding agent for a short moment. The binding agent is in this manner caused to penetrate the surface layer of the moulded articles to a depth of some millimeters whereby on the drying of the articles the latter obtain a shell of comparatively great firmness and the subsequent handling of the moulded articles is rendered possible without any essential losses on account of breakage. As the supply of the binding agent takes place after the termination of the gas developing reaction, said agent cannot have any undesirable influence on the formation of the pores in the material and as only a thin shell is impregnated, while the chief mass of the bodies consists exclusively of refractory material the binding agent is easily burnt away at the firing of the moulded bodies.

When the moulded bodies have been impregnated with a binding agent as above described they are dried at a moderately elevated temperature and then fired at a high temperature sufficient to bake together the refractory material by sintering without injuring the porous structure produced by the gas development in the mass before or in the moulding operation.

At the firing operation the bodies get their final mechanical strength and a structure most reminding of that of pumice but the product is more refractory than natural porous minerals and stones.

For the aluminium powder I can use any other substance in a finely divided state which develops gas when reacted upon by means of water or an alkaline solution, as for instance calcium, zinc, calcium carbide etc.

The refractory material used in the process should, preferably, be in a mealfine state but it is not necessary that the whole quantity of such material is mealfine inasmuch as a portion thereof, say for instance up to 50%, may be coarsely ground with corn sizes up to 2 m. m. dependent on the porosity and mechanical strength of the finished product that may be desired. The more coarsely ground material is used the more will the firmness and mechanical strength of the fired product increase but at the same time its porosity will correspondingly decrease.

What I claim is:—

The process of making porous refractory articles, which comprises producing an intimate plastic mixture of non-setting refractory material, gas developing material and water, allowing gas development to take place in the plastic mixture while in the cold state to produce a substantially uniform distribution of voids throughout the mass thereof, molding bodies of the porous plastic mass, impregnating the surface layer of the said bodies with a binding agent while leaving the cores of the bodies free from binding agent, drying the impregnated bodies, and finally firing them at a high temperature.

In testimony whereof I have signed my name.

IVAR SETTERBERG.